Jan. 28, 1964 W. TIETZE ETAL 3,119,722
BATTERY
Filed Dec. 29, 1959 3 Sheets-Sheet 1

INVENTORS
Werner Tietze
Helmut Peters
BY
Michael S. Striker
Attorney

Jan. 28, 1964 W. TIETZE ETAL 3,119,722
BATTERY
Filed Dec. 29, 1959 3 Sheets-Sheet 2
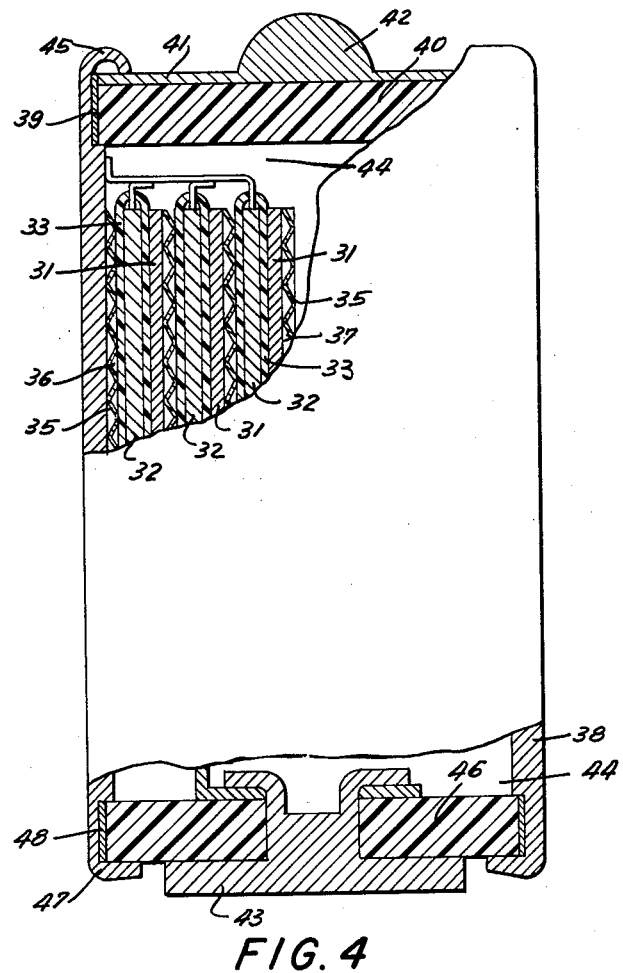
FIG. 4
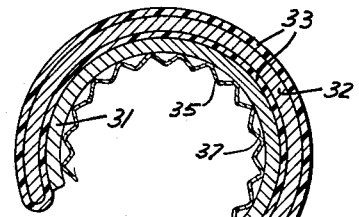
FIG. 3
INVENTORS
Werner Tietze
BY Traimute Peters
Michael S. Striker
Attorney Jan. 28, 1964    W. TIETZE ETAL    3,119,722
BATTERY
Filed Dec. 29, 1959    3 Sheets-Sheet 3
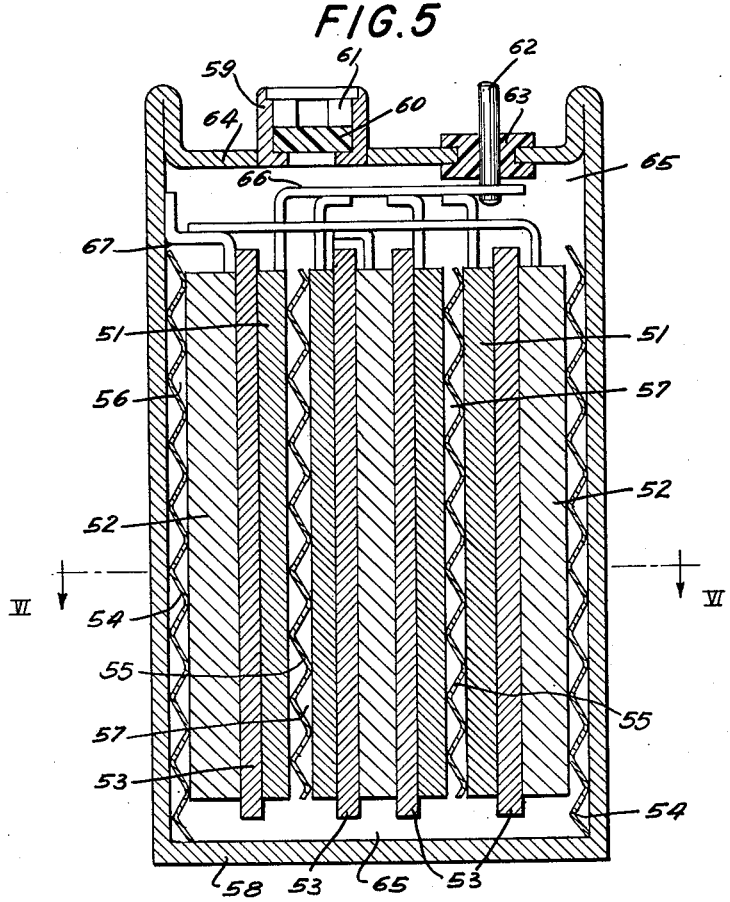
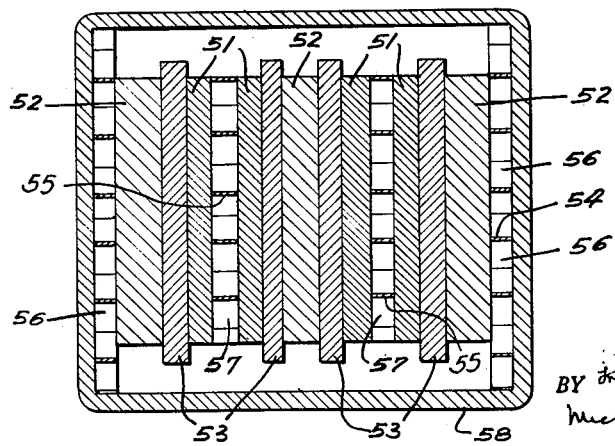

United States Patent Office 3,119,722
Patented Jan. 28, 1964

3,119,722
BATTERY
Werner Tietze and Freimut Peters, Hagen, Westphalia, Germany, assignors to Varta Aktiengesellschaft
Filed Dec. 29, 1959, Ser. No. 862,533
Claims priority, application Germany Dec. 31, 1958
8 Claims. (Cl. 136—6)

The present invention relates to a battery, and more particularly it relates to a sealed alkaline storage battery.

It is frequently desirable to form the housing of such sealed battery partially of metal and partially of materials which do not conduct electricity such as synthetic plastic materials. In such cases where metallic housing portions abut non-metallic electrically insulating portions, it is of course necessary to obtain a tight fit between the abutting housing wall portions. Such tight fit is essential in order to maintain the battery in sealed condition. Nevertheless, it has been found that the electrolyte, even if the major portion of the same is fixed by capillary action in the pores of the separator and electrodes, has a tendency to seep or creep through the necessarily not absolutely tight joint between abutting metal and plastic housing wall portions. This tendency of the electrolyte to pass outwardly between the abutting housing wall portions will increase if during operation of the battery overpressure is built up and causes a widening of the joint between the abutting housing wall portions.

Usually, the metal housing of permanently hermetically sealed alkaline storage batteries is conductively connected with the negative electrode. However, in cases where the housing is formed of metallic wall portions and wall portions of synthetic plastic material, it appears to be impossible to maintain such housing in liquid-tight condition. After prolonged operation of such battery, frequently incrustations of alkali carbonate crystals can be observed on the outside of the housing along the joints of abutting metallic and non-metallic housing wall portions. Such incrustations are formed due to contact between the alkaline electrolyte and the carbon dioxide of the air.

It is therefore an object of the present invention to overcome the aforementioned disadvantages and difficulties which occur in connection with battery housings formed of metallic and non-conductive wall portions.

It is another object of the present invention to provide a sealed alkaline storage battery having a housing formed partially of conductive and partially of non-conductive wall portions, wherein outward seepage of the electrolyte will not occur even upon prolonged usage and handling.

Other objects and advantages of the present invention will become apparent from a further reading of the description and of the appended claims.

With the above and other objects in view, the present invention includes a sealed alkaline storage battery, comprising, in combination, first wall means made of metal and second wall means made of electrically insulating material, the first and second wall means abutting each other and defining a housing, means for sealing the housing, an electrode assembly located within the housing filling the same but partly and including at least two electrodes of opposite polarity, separator means between and in contact with adjacent surface portions of adjacent electrodes of opposite polarity each of the electrodes having a free surface portion partially defining a gas space within the housing, and an alkaline electrolyte at least partially capillarily fixed in the separator means and the electrodes, the electrolyte also forming a film on the free surface portions of the electrodes, and means for conductively connecting the positive electrode with the first wall means made of metal, whereby gases formed during operation of the battery will be at least partially consumed in contact with the free surface portions of the electrodes so that development of substantial overpressure within the housing will be prevented and migration of electrolyte will be retarded and whereby, due to the electrical connection between the metal wall means and the positive electrode, seepage between abutting first and second wall portions of any electrolyte reaching the same will be prevented.

In a preferred embodiment, the alkaline storage battery of the present invention comprises first wall means made of metal and second wall means made of electrically insulating material, the first and second wall means abutting each other and defining a housing and said first wall means forming at least about 70% of the housing, means for sealing the housing, an electrode assembly located within the housing filling the same but partly and including at least two electrode plates of opposite polarity each having a pair of opposite faces, separator means between and in contact with adjacent surface portions of adjacent electrodes of opposite polarity, the electrodes of opposite polarity having free surface portions partially defining a gas space within the housing, the free surface portions of electrodes of each polarity, respectively, having an area at least equal to the area of one of the opposite electrode faces, and an alkaline electrolyte at least partially capillarily fixed in the separator means and the electrodes, the electrolyte also forming a film on the free surface portions of the electrodes, one electrode plate of each of the opposite polarities facing the housing, electrically insulating spacer means for spacing the one negative electrode plate from the wall means of the housing, whereby gases formed during operation of the battery will be at least partially consumed in contact with the free surface portions of the electrodes so that development of substantial overpressure within the housing will be prevented and migration of electrolyte will be retarded and whereby, due to the electrical connection between the metal wall means and the positive electrode, seepage between abutting first and second wall portions of any electrolyte reaching the same will be prevented.

Suprisingly, it has been found that, according to the present invention, seepage of electrolyte through the joints between abutting conductive and insulating housing wall portions can be avoided, provided that the conductive housing wall portions are connected with the positive electrode and, furthermore, that sufficiently large portions of the electrodes extend into the gas space defined between the interior walls of the housing and the electrode assembly therein, so that gases formed during operation of the battery will be quickly consumed in contact with these exposed and electrolyte film covered electrode portions and pressure within the battery will not rise appreciably, i.e. to an extent which would exert a sufficient force against the housing to cause expansion of the joints between adjacent conductive and non-conductive housing wall portions.

The combined effect of minimizing overpressure within the battery housing and of electrically connecting the metallic housing portions with the positive electrode will effectively prevent electrolyte seepage through the joints between adjacent conductive and insulating housing wall portions.

Preferably, the portions of surface areas of the positive as well as of the negative electrodes which are exposed to the gas space will at least be equal to the surface area of one of the electrodes of the respective polarity.

According to the present invention, the creepage paths of the electrolyte between the metallic and plastic housing wall portions will be under the influence of the positive potential of the metallic housing wall portion. In combination therewith, the width of the capillary joint between the housing wall portions will be very small and will not be increased to any considerable extent since, due to the absence of appreciable overpressure within the battery, the joints are not subjected to mechanical stress. It is thus possible by proper shaping and assembly of the housing to maintain the width of joints below $10^{-4}$ or even below $10^{-5}$ cm., and to maintain such small dimensions of the joint. In this manner, the joints will be absolutely electrolyte-tight since, due to the effective gas consumption within the battery, neither during supercharging nor during deep discharge with reversal of polarity build-up of a harmful internal pressure will occur.

According to a preferred embodiment which will be described in more detail further below, surface portions of the electrode plates are exposed to the gas space and thus made available for gas consumption by arranging spacers between the inner face of the battery housing and adjacent electrodes of both polarities. The spacers between the electrode housing and the positive electrode are preferably made of conductive metal so as to not only space the positive electrode from the housing but also to provide an electrical connection between metallic wall portions of the housing and the positive electrode. Preferably, these metallic spacers consist of nickel or nickel-plated metal. The spacers may be in the shape of metal wires, stretch metal, perforated sheets or profiled metal sheets, for instance of corrugated shape. However, the spacer means may also be integral with the metallic wall portions of the housing and may be formed of inwardly extending portions of the same which, for instance, may be pressed into the wall forming metal sheet.

The spacers between the negative electrode and the housing preferably consists of an insulating material such as a synthetic plastic material, in order to prevent electrical contact between the negative electrode and the metal portions of the housing.

It is also possible to form the exposed electrode portions in a different manner, for instance, by splitting the positive and the negative electrode, respectively, into two or more partial electrodes of substantially equal surface area and to arrange spacers between adjacent faces of the respective electrodes so that these adjacent faces will be substantially free and exposed to the gas space.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a cross-sectional longitudinal view of an electrode arrangement;

FIG. 4 is a fragmentary view partially in cross-section of a round cell incorporating the electrode arrangement of FIG. 3;

FIG. 5 is an elevational view in cross-section of a rectangular cell according to the present invention including flat electrodes; and FIG. 6 is a plan view in cross-section taken along lines VI—VI of FIG. 5.

Figure 1:
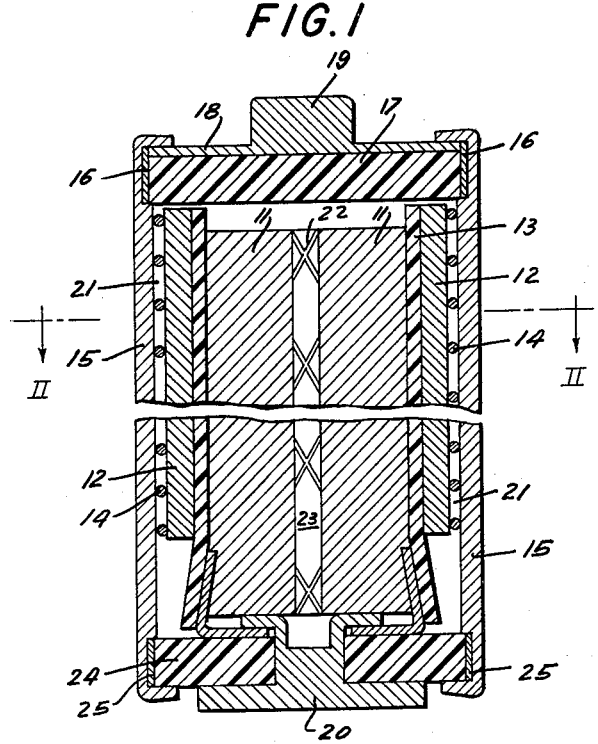
FIG. 1 is a fragmentary elevational view in cross-section of a round cell battery according to the present invention.
Figure 2:
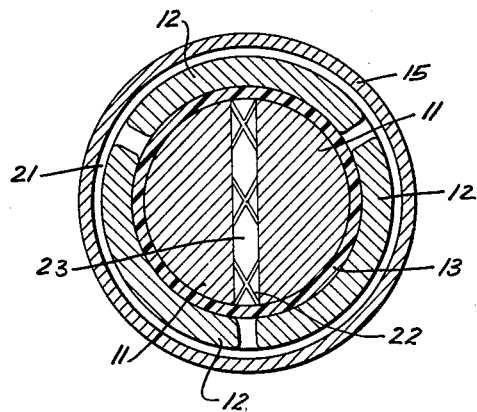
FIG. 2 is a cross-sectional plan view taken along lines II—II of FIG. 1.

Referring now to the drawing, and particularly to FIGS. 1 and 2, it will be seen that in the center portion of the cell the two negative half electrodes 11 are arranged spaced from each other by spacer 22 made of nickel or nickel-plated iron. In this manner, the inward faces of negative half electrodes 11 are free and accessible for gas which will collect in gas space 23. The pair of negative half electrodes 11 is surrounded on its substantially cylindrical outer face by finely porous absorbent separator 13. The positive electrode consists of three individual electrodes 12 which define together the major portion of an annular cylinder arranged coaxially with the negative electrode. The outer faces of positive electrodes 12 are spaced from the housing by metallic spacers 14 made of nickel or nickel-plated iron. Spacers 14 form an electrically conductive connection between the electrically conductive portion 15 of the housing and positive electrodes 12. Thus, spacers 14 serve to give to the metallic portion 15 of the housing the potential of positive electrodes 12, and also to space the outer faces of positive electrodes 12 from the housing so that these outer faces of positive electrodes 12 will be accessible to gas (oxygen) present or formed during operation of the cell. This gas will collect in gas space 21. The free outer faces of the positive electrodes 12 will serve, upon deep discharge with reversal of polarity, for consuming oxygen gas developed at the negative electrode.

In its upper portion, the cylindrically shaped cell is closed by synthetic plastic disc 17, preferably made of a polyamide or of polytetrafluoroethylene. Plastic disc 17 is firmly gripped by the flanging rim of the housing formed with an annular recess, so that disc 17 and metal housing portion 15 abut each other along joint 16. Metal disc 18 made of nickel or nickel-plated iron is superposed upon disc 17 and is formed with terminal portion 19. Thus, metal disc 18 with terminal portion 19 is conductively connected with the positive electrodes 12 via the flanged portion of the metal housing wall 15 and metal spacers 14 so that the portion 19 of metal disc 18 will form the positive terminal of the battery.

The lower end portion of the cell is closed by synthetic plastic disc 24, and disc 24 is kept in its position by extending into the flanged lower end portion of the metal wall of the housing, so that joint 25 between metal wall 15 and plastic disc 24 will be tight against the passage of gas or electrolyte therethrough. Plastic disc 24 is formed with a center hole through which passes terminal 20, and terminal 20 is in contact with the lower end of the negative electrode.

Due to the sufficiently large size of the exposed surface areas of the negative and positive electrodes which are in contact with gas spaces 23 and 21, effective gas consumption is assured during supercharging as well as upon deep discharge with reversal of polarity. This consumption of gases developing during operation of the battery at a rate sufficient to prevent building up excessive overpressure will safeguard the fluid-tight seal of the battery at the joints between plastic end walls 17 and 24, and cylindrical metal wall 15 of the housing.

The free surface area of the positive electrode is substantially equal to the outer cylindrical surface of the entire electrode arrangement, while the free inward faces of the negative half electrodes have about half the area thereof.

The assembly of a cell according to FIGS. 1 and 2 can be further simplified (not illustrated) by replacing plastic disc 17 with a metal wall portion integral with cylindrical metal wall 15 and including a terminal portion similar to terminal portion 19. In this case, the metal portion of the housing will be cup-shaped.

Furthermore, spacer 14 can be replaced by inwardly extending portions of housing 15, formed for instance like reinforcing fins. In this case it is then unnecessary to provide a separate spacer element 14.

FIG. 3 illustrates a different electrode arrangement which is also destined to be incorporated in a cylindrical cell. In this case, the electrode arrangement comprises a flexible negative electrode 31 which may be spirally wound, and an also flexible positive electrode 32. Positive electrode 32 is covered by separator 33. On one face of the negative electrode foraminous spacer 35 made of nickel or nickel-plated iron, is arranged so as to substantially free the outer surface area of the negative electrode. In this manner, a gas space 37 is maintained adjacent to said outer surface of the negative electrode. The positive electrode 32 is formed wtih an extension 34 consisting of a metal body of great surface area due to the openings 36 therein. Metal body 34 is free of active mass and its entire surface area will be available for gas consumption.

FIG. 4 illustrates the assembly of a cell including the electrode arrangement of FIG. 3. Metal container 38 is fluid-tightly closed at both ends in a manner similar to what has been described in connection with FIG. 1. Inserted in the container is the spirally wound electrode arrangement comprising negative electrode 31 and positive electrode 32. Both faces of positive electrode 32 are covered by separator 33. One face of negative electrode 31 is covered with the wide-mesh spacer 35 made of nickel or nickel-plated iron so that a gas space 37 is formed in the interstices of spacer 35. At the free surface area of the negative electrode which contacts gas space 37, oxygen developed during charging of the battery will be consumed. Gas space 37 communicates with additional gas spaces 44.

The active mass-free portion 34 of the positive electrode outwardly surrounds the spirally wound electrode arrangement and forms a current conducting link with metal housing 38. Simultaneously, portion 34 defines a gas space at the periphery of the spiral electrode arrangement. Gas space 36 will serve for consuming gas formed during deep discharge and reversal of polarity.

Cylindrical metal container 38 is fluid-tightly closed at one end by the insertion of plastic disc 40 into the flanged rim portion 45 so that neither gas nor liquid can pass outwardly through the joint 39 between rim portion 45 and disc 40. Metal disc 41 formed with terminal portion 42 is superposed upon plastic disc 40 and is conductively connected with rim portion 45.

At its lower end, the housing is closed by plastic disc 46 which is inserted into the recessed rim portion 47 of the metal housing, forming a fluid-tight joint 48 between the cylindrical metal housing and plastic disc 46. Terminal lead member 43 passes through the center portion of disc 46 and is conductively connected to the negative electrode.

FIGS. 5 and 6 illustrate a rectangular battery cell according to the present invention wherein the individual electrodes are of rectangular shape.

The housing 58 consists entirely of metal, preferably nickel-plated steel and is fluid-tightly closed. Positive electrodes 52 and negative electrodes 51 are arranged within the housing. Negative electrode 51 is divided into two half electrodes spaced from each other by wide-mesh spacer 55 made of nickel or nickel-plated iron, for instance of stretch metal or of a wire mesh. In this manner, the inner faces of the negative half electrodes are freed and will define in part the gas space 57 which communicates with other gas spaces 65.

During charging, oxygen gas will be consumed at the free inner faces of the negative half electrodes. According to FIGS. 5 and 6, these free inner faces of the negative electrodes have a total area equal to four times the area of one face of an electrode, so that the entire area of the free faces of the negative electrodes will be greater than one-quarter of the peripheral area of the entire electrode arrangement. Positive and negative electrodes are spaced from each other by finely porous non-conductive separator 53, in the pores of which as well as in the pores of the electrodes the main portion of the electrolyte required for operation of the battery, is fixed by capillary action.

Between the surface portions of the positive electrodes which face the metal housing and the latter, metallic spacers 54 such as stretch metal or wire mesh bodies made of nickel or nickel-plated iron, are arranged in such a manner that the outer faces of the outer positive electrodes are freed and in contact with the gas space 56 formed by spacer 54 between the housing and the adjacent positive electrodes. Gas spaces 56, 57 and 65 communicate with each other.

Oxygen formed at the negative electrodes during deep discharge and reversal of polarity will be consumed at these free faces of the positive electrodes. The total area of the free faces of the positive electrodes is greater than one-quarter of the peripheral area of the entire electrode arrangement.

The conductive connection between the positive electrodes and metal housing 58 is formed by metallic spacer 54. Furthermore, the set of positive electrodes is conductively welded to the housing as indicated by reference numeral 67. Thus, the housing will have the potential of the positive electrode. The housing includes in addition to element 58, the metal cover 64 which serves to fluid-tightly close the entire housing. Terminal lead 62 of the negative electrode passes through metal cover 64 and is insulated against the same by ring 63 made of insulating plastic material. The negative electrodes are conductively connected with terminal 62 by nickel or nickel-plated iron members 66.

Inlet and outlet feed member 59 is arranged on metal cover 64 and serves for introducing electrolyte into the battery prior to forming the same. Excess electrolyte is removed through feed member 59 after formation of the battery has been completed, either by centrifugal force or by placing the battery in a position wherein outlet 59 faces downwardly. Thereafter, member 59 is closed by first inserting sealing disc 60 made of a synthetic plastic material which preferably possesses resilient quality. Sealing disc 60 contacts a sharp-edged annular edge of metal disc 64 and is pressed against the same by tightening of screw 61, so that member 59 will be absolutely fluid-tightly closed.

Due to the positive potential of the metal housing, the joint between metal member 59 and sealing ring 60 will be under the influence of the potential of the positive electrode and thus, seepage of liquid through the joint will not occur, particularly since the joint is not exposed to an excessive pressure from the inside of the housing. Thus, the arrangement of elements 59 and 60 will also continue to serve as a safety element allowing opening of the battery if required, since no incrustations of potassium carbonate will be formed such as would be produced by contact between the electrolyte and carbon dioxide of the air.

According to another embodiment, the plates in a cell according to FIGS. 5 and 6 may also be arranged in such a manner that two negative electrodes will be located at the ends of the set of electrode plates. Such negative electrodes will then have to be spaced by separators 53 from adjacent positive electrodes 52, and by non-conductive spacers from metallic housing 58. Preferably, the insulating spacer between the outermost negative electrodes and the metallic housing will be formed as a wide mesh structure in order to allow sufficient contact between gases developed during operation of the battery and the free outer faces of the outer negative electrodes.

Since in the latter case all positive electrodes will be covered by separators, it is desirable to split at least one positive electrode, for instance a positive electrode in the center of the electrode arrangement, into two partial electrodes which will be spaced from each other by a spacer 55, so that the inner faces of the split electrode will contact a gas space in a manner similar to what has been illustrated with respect to a split negative electrode.

With respect to all batteries according to the present invention, the electrolyte which is required for operation of the cell will be mainly located in the pores of the electrodes and separators and fixed therein by capillary action.

The present invention is not limited to any specific type of electrodes. If electrodes containing active mass are used, for instance, porous sinter electrodes in the pores of which the active mass is located, or electrodes in which the active mass is contained in a perforated housing, or electrodes in which the active mass is held by a wide mesh carrier such as stretch metal or a wire mesh fabric. It is also possible to use electrodes which are produced by compressing pulverulent active mass (and which of course also contain a current conducting material). In the latter case, the negative electrodes may for instance be pressed of a mixture of cadmium mass and nickel powder and the positive electrodes for instance of silver oxide or a mixture of silver oxide and nickel powder.

If the electrodes are to be free of active mass, they may be formed of porous nickel sinter bodies, of nickel wire mesh, stretch metal, perforated nickel-plated steel sheets or also of porous bodies consisting of nickel or nickel-plated iron.

Formation of battery cells according to the present invention, for the purpose of putting the cell in operating condition, may be carried out in any manner known per se. The cells may be sealed in a state wherein the negative electrode possesses a greater capacity to accept electric charge than the positive electrode (charge reserve of the negative electrode), or after both electrodes have been completely charged and the electrolyte thereafter has been removed, or after such complete charging and subsequent discharge of the battery until the electrode which determines and limits the useful capacity of the battery has been completely discharged. It is also possible in accordance with other known methods of forming the battery, to treat the cell after the removal of the free flowing portion electrolyte in any desired charge condition with gaseous oxygen.

The capacity of the electrodes relative to each other may also be arranged in any desired manner known per se, for instance so that the negative electrode contains at all times more chargeable reducible particles than the content of the positive electrode of chargeable oxidizable particles, all particles measured in electrochemical equivalents. For instance, the positive electrode may consist exclusively of regular nickel hydroxide mass and may at all times contain more reducible particles than the content of the negative electrode of oxidizable particles. In other words, the positive electrode may possess a discharge reserve. Or the positive electrode may also include an addition of anti-polar mass, for instance negative cadmium mass, the quantity of which relative to the quantity of regular active mass of the positive electrode is to be so chosen that the useful capacity of the cell is limited by the positive electrode.

The electrode variations with respect to electrode structures and capacities as well as with respect to the charging state of the electrodes are given as examples only and it is not intended to limit the invention to any of the specific details described hereinabove. The last mentioned example indicates that the negative electrode will at all times contain more dischargeable oxidizable particles than the quantity of dischargeable reducible particles of the regular positive nickel hydroxide mass.

In any event, according to the present invention due to the prevention of harmful overpressure within the battery, in combination with the positive potential of the metallic housing wall portions, it will be achieved that during charging as well as during deep discharge with reversal of polarity and of course also during operation of the battery under normal operating conditions, electrolyte will not pass into and through the fine joints between individual wall forming portions of the housing.

It will be understood that each of the elements described above, or two or more together, may also find a useful application in other types of batteries differing from the types described above.

While the invention has been illustrated and described as embodied in a hermetically sealed alkaline storage battery, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A sealed alkaline storage battery, comprising, in combination, a housing consisting essentially of first wall means made of metal and second wall means made of electrically insulating material, said first and second wall means abutting each other; means for sealing said housing; an electrode assembly located within said housing filling the same but partly and including at least two electrodes of opposite polarity, separator means between and in contact with adjacent surface portions of adjacent electrodes of opposite polarity each of said electrodes having a free surface portion partially defining a gas space within said housing, and an alkaline electrolyte at least partially capillarily fixed in said separator means and said electrodes, said electrolyte also forming a film on said free surface portions of said electrodes; and means for conductively connecting said positive electrode with said first wall means made of metal so that the entire metal portion of said housing is electrically connected to said positive electrode, whereby gases formed during operation of said battery will be at least partially consumed in contact with said free surface portions of said electrodes so that development of substantial overpressure within said housing will be prevented and migration of electrolyte will be retarded and whereby, due to said electrical connection between said metal wall means and said positive electrode, said metal wall means thus being positively charged, seepage between abutting first and second wall portions of any electrolyte reaching the same will be prevented.

2. A sealed alkaline storage battery, comprising, in combination, a housing consisting essentially of first wall means made of metal and second wall means made of electrically insulating material, said first and second wall means abutting each other; means for sealing said housing; an electrode assembly located within said housing filling the same but partly and including at least two electrode plates of opposite polarity each having a pair of opposite faces, separator means between and in contact with adjacent surface portions of adjacent electrodes of opposite polarity, said electrodes of opposite polarity having free surface portions partially defining a gas space within said housing the free surface portions of electrodes of each polarity, respectively, having an area at least equal to the area of one of said opposite electrode faces, and an alkaline electrolyte at least partially capillarily fixed in said separator means and said electrodes, said electrolyte also forming a film on said free surface portions of said electrodes; and means for conductively connecting said positive electrode with said first wall means made of metal so that the entire metal portion of said housing is electrically connected to said positive electrode, whereby gases formed during operation of said battery will be at least partially consumed in contact with said free surface portions of said electrodes so that development of substantial overpressure within said housing will be prevented and migration of electrolyte will be retarded and whereby, due to said electrical connection between said metal wall means and said positive electrode, said metal wall means thus being positively charged, seepage between abutting first and second wall portions of any electrolyte reaching the same will be prevented.

3. A sealed alkaline storage battery, comprising, in combination, a housing consisting essentially of first wall means made of metal and second wall means made of electrically insulating material, said first and second wall means abutting each other; means for sealing said housing; an electrode assembly located within said housing filling the same but partly and including at least two electrodes of opposite polarity, separator means between and in contact with adjacent surface portions of adjacent electrodes of opposite polarity, each of said electrodes having a free surface portion partially defining a gas space within said housing, and an alkaline electrolyte at least partially capillarily fixed in said separator means and said electrodes, said electrolyte also forming a film on said free surface portions of said electrodes; spacer means for spacing said electrodes from said wall means of said housing and means for conductively connecting said positive electrode with said first wall means made of metal so that the entire metal portion of said housing is electrically connected to said positive electrode, whereby gases formed during operation of said battery will be at least partially consumed in contact with said free surface portions of said electrodes so that development of substantial overpressure within said housing will be prevented and migration of electrolyte will be retarded and whereby, due to said electrical connection between said metal wall means and said positive electrode, said metal wall means thus being positively charged, seepage between abutting first and second wall portions of any electrolyte reaching the same will be prevented.

4. A sealed alkaline storage battery, comprising, in combination, a housing consisting essentially of first wall means made of metal and second wall means made of electrically insulating material, said first and second wall means abutting each other; means for sealing said housing; an electrode assembly located within said housing filling the same but partly and including at least two electrodes of opposite polarity, separator means between and in contact with adjacent surface portions of adjacent electrodes of opposite polarity, each of said electrodes having a free surface portion partially defining a gas space within said housing, and an alkaline electrolyte at least partially capillarily fixed in said separator means and said electrodes, said electrolyte also forming a film on said free surface portions of said electrodes; and means for spacing and conductively connecting said positive electrode with said first wall means made of metal so that the entire metal portion of said housing is electrically connected to said positive electrode, whereby gases formed during operation of said battery will be at least partially consumed in contact with said free surface portions of said electrodes so that development of substantial overpressure within said housing will be prevented and migration of electrolyte will be retarded and whereby due to said electrical connection between said metal wall means and said positive electrode, said metal wall means thus being positively charged, seepage between abutting first and second wall portions of any electrolyte reaching the same will be prevented.

5. A sealed alkaline storage battery, comprising, in combination, a housing consisting essentially of first wall means made of metal and second wall means made of electrically insulating material, said first and second wall means abutting each other; means for sealing said housing; an electrode assembly located within said housing filling the same but partly and including at least two electrode plates of opposite polarity each having a pair of opposite faces, separator means between and in contact with adjacent surface portions of adjacent electrodes of opposite polarity, said electrodes of opposite polarity having free surface portions partially defining a gas space within said housing the free surface portions of electrodes of each polarity, respectively, having an area at least equal to the area of one of said opposite electrode faces, and an alkaline electrolyte at least partially capillarily fixed in said separator means and said electrodes, said electrolyte also forming a film on said free surface portions of said electrodes, one electrode plate of each of said opposite polarities facing said housing; electrically insulating spacer means for spacing said one negative electrode plate from said wall means of said housing; and electrically conductive spacer means for spacing said one positive electrode plate from said metallic wall means of said housing so that the entire metal portion of said housing is electrically connected to said positive electrode, whereby gases formed during operation of said battery will be at least partially consumed in contact with said free surface portions of said electrodes so that development of substantial overpressure within said housing will be prevented and migration of electrolyte will be retarded and whereby, due to said electrical connection between said metal wall means and said positive electrode, said metal wall means thus being positively charged, seepage between abutting first and second wall portions of any electrolyte reaching the same will be prevented.

6. A sealed alkaline storage battery as defined in claim 1, wherein each of said electrodes of opposite polarity is formed as a split electrode comprising two portions of substantially equal surface area, said portions being arranged substantially parallel to and spaced from each other; and spacer means for maintaining said portions of said split electrodes, respectively, spaced from each other.

7. A sealed alkaline storage battery, comprising, in combination, a housing consisting essentially of first wall means made of metal and second wall means made of electrically insulating material, said first and second wall means abutting each other and said first wall means forming at least about 70% of said housing; means for sealing said housing; an electrode assembly located within said housing filling the same but partly and including at least two electrodes of opposite polarity, separator means between and in contact with adjacent surface portions of adjacent electrodes of opposite polarity, each of said electrodes having a free surface portion partially defining a gas space within said housing, and an alkaline electrolyte at least partially capillarily fixed in said separator means and said electrodes, said electrolyte also forming a film on said free surface portions of said electrodes; and means for conductively connecting said positive electrode with said first wall means made of metal so that the entire metal portion of said housing is electrically connected to said positive electrode, whereby gases formed during operation of said battery will be at least partially consumed in contact with said free surface portions of said electrodes so that development of substantial overpressure within said housing will be prevented and migration of electrolyte will be retarded and whereby, due to said electrical connection between said metal wall means and said positive electrode, said metal wall means thus being positively charged, seepage between abutting first and second wall portions of any electrolyte reaching the same will be prevented.

8. A sealed alkaline storage battery, comprising, in combination, first and second wall means made of metal, said first and second wall means abutting each other and defining a housing; means for sealing said housing; an electrode assembly located within said housing filling the same but partly and including at least two electrodes of opposite polarity, separator means between and in contact with adjacent surface portions of adjacent electrodes of opposite polarity each of said electrodes having a free surface portion partially defining a gas space within said housing, and an alkaline electrolyte at least partially capillarily fixed in said separator means and said electrodes, said electrolyte also forming a film on said free surface portions of said electrodes; and means for conductively connecting said positive electrode with at least one of said first and second wall means made of metal so that at least said one wall means of metal is electrically connected to said positive electrode, whereby gases formed during operation of said battery will be at least partially consumed in contact with said free surface portions of said electrodes so that development of substantial overpressure within said housing will be prevented and migration of electrolyte will be retarded and whereby, due to said electrical connection between said metal wall means and said positive electrode, said metal wall means thus being positively charged, seepage between abutting first and second wall portions of any electrolyte reaching the same will be prevented.

References Cited in the file of this patent

UNITED STATES PATENTS

| | | |
|---|---|---|
| 2,636,058 | Neumann | Apr. 12, 1953 |
| 2,693,499 | Neumann | Nov. 2, 1954 |
| 2,842,607 | Germershausen et al. | July 8, 1958 |
| 2,980,745 | Peters | Apr. 18, 1961 |

FOREIGN PATENTS

| | | |
|---|---|---|
| 741,345 | Great Britain | Nov. 30, 1955 |